United States Patent [19]

Okumura et al.

[11] 3,865,690
[45] Feb. 11, 1975

[54] FERMENTATIVE PRODUCTION OF L-LEUCINE

[75] Inventors: Shinji Okumura, Tokyo; Fumihiro Yoshinaga, Kanagawa-ken; Koji Kubota, Tokyo; Hirotaka Kamijo, Tokyo, all of Japan

[73] Assignee: Ajinomoto Co., Inc., Tokyo, Japan

[22] Filed: Dec. 20, 1972

[21] Appl. No.: 316,712

Related U.S. Application Data

[63] Continuation-in-part of Ser. No. 82,488, Oct. 20, 1970, abandoned.

[30] Foreign Application Priority Data

Nov. 6, 1969    Japan.............................. 44-88906

[52] U.S. Cl.................. 195/28 R, 195/29, 195/30, 195/47
[51] Int. Cl............................................ C12d 13/06
[58] Field of Search................ 195/28 R, 29, 30, 47

[56]         References Cited
        UNITED STATES PATENTS
3,668,073    6/1962    Kurihara et al...................... 195/29

Primary Examiner—Alvin E. Tanenholtz
Attorney, Agent, or Firm—Hans Berman; Kurt Kelman

[57]              ABSTRACT

Certain strains of the genera Brevibacterium and Corynebacterium which are resistant to leucine antagonists produce L-leucine in a culture medium.

7 Claims, No Drawings

FERMENTATIVE PRODUCTION OF L-LEUCINE

This application is a continuation-in-part of our co-pending application Ser. No. 82,488, filed on Oct. 20, 1970, and now abandoned.

The present invention relates to a method of producing L-leucine by bacterial fermentation.

L-Leucine is one of the essential amino acids, and has been used in food additives. It has been customary heretofore to hydrolyze natural proteins and to isolate L-leucine from the resulting mixture of amino acids by fractionation.

It has now been found that some bacteria belonging to the genera Brevibacterium and Corynebacterium, and resistant to a leucine antagonist produce a large amount of leucine when cultured in a nutrient medium. The L-leucine producing mutants may be isolated from natural sources, or can be derived by conventional mutant inducing procedures, such as X-ray radiation, ultraviolet light irradiation, or treatment with nitrosoguanidines, diethylsulfate or nitrite. L-leucine producing bacteria include Brevibacterium flavum AJ-3226 (FERM P-420, microorganisms identified by FERM P-numbers are available to the public from the Fermentation Research Institute, Agency of Industrial Science and Technology, of the Ministry for Industrial Trade and Industry, Inage-city, Chiba-prefecture, Japan) which has been derived from Brevibacterium flavum ATCC 14067, Brevibacterium lactofermentum AJ-3427 (FERM P-1769) which has been derived from Brevibacterium lactofermentum ATCC 13869, Corynebacterium acetoacidophilum AJ-3228 (FERM P-421) which has been derived from Corynebacterium acetoacidophilum ATCC 13870, and Corynebacterium glutamicum AJ-3426 (FERM P-1768) which has been derived from Micrococcus glutamicus ATCC 13032 (Micrococcus glutamicus is now referred to as Corynebacterium glutamicum). Leucine antagonists include 2-thiazolealanine, 4-azaleucine, 5', 5', 5'-trifluoroleucine, D-leucine, α-amino-isoamylsulfonic acid, norvaline, norleucine, methallyglycine, α-amino-β-chlorobutyric acid, δ-chloroleucine, β-hydroxynorleucine, β-hydroxyleucine, cyclopentanealanine, 3-cyclopentene-1-alanine, 2-amino-4-methyl-hexanoic acid.

The following Table 1 shows the growth of bacteria which are resistant to 2-thiazolealanine or 4-azaleucine and bacteria which are not resistant, when cultured on media containing varying amounts of 2-thiazolealanine or 4-azaleucine. Brevibacterium flavum AJ-3226, Brevibacterium flavum ATCC 14067, Corynebacterium acetoacidophilum AJ-3228 and Corynebacterium acetoacidophilum ATCC 13870 which had previously been cultured on slants containing 1% yeast extract, 1% peptone, 0.5% NaCl and 0.5% glucose were suspended in basal media containing 2% glucose, 1% $(NH_4)_2SO_4$, 0.1% $KH_2PO_4$, 0.04% $MgSO_4 \cdot 7H_2O$, 2 ppm Fe and Mn ions, 50 μg/l biotin, 200 μg/l thiamine hydrochloride, 0.05% NaCl and 3% $CaCO_3$ (separately sterilized), of pH 7.0 (adjusted with KOH). 0.1 ml Amounts of the suspensions were inoculated on 3 ml basal media additionally containing 2-thiazolealanine or 4-azaleucine as indicated in γ/ml in Table 1, and cultured at 31°C for 24 hours, but AJ-3226 was cultured for 38 hours. 0.2 ml Amounts of the respective culture broths obtained were added to 5 ml water, solid calcium carbonate was dissolved by adding a drop of concentrated HCl, and optical density (OD) was determined by measuring light absorbancy of the diluted broths at 562 mμ.

Table 1

| Initial suspension*1 | | ATCC 14067 OD 0.075 | Specific turbidity | AJ-3226 OD 0.070 | Specific turbidity | ATCC 13870 OD 0.115 | Specific turbidity | AJ-3228 OD 0.108 | Specific turbidity |
|---|---|---|---|---|---|---|---|---|---|
| Additive 2-TA*2 | None | 0.640 | 100 | 0.425 | 100 | 0.560 | 100 | 0.465 | 100 |
| | 50 | 0.440 | 69 | 0.434 | 102 | 0.285 | 51 | 0.450 | 97 |
| | 100 | 0.325 | 51 | 0.420 | 99 | 0.170 | 30 | 0.400 | 86 |
| | 250 | 0.228 | 36 | 0.465 | 109 | 0.120 | 21 | 0.345 | 74 |
| | 500 | 0.185 | 29 | 0.490 | 115 | 0.099 | 18 | 0.300 | 65 |
| | 1000 | 0.088 | 14 | 0.450 | 106 | 0.082 | 15 | 0.264 | 57 |
| | 2000 | 0.043 | 7 | 0.365 | 86 | 0.048 | 9 | 0.265 | 57 |
| 4-AL*3 | 50 | 0.415 | 65 | 0.430 | 101 | 0.320 | 57 | 0.445 | 96 |
| | 100 | 0.310 | 48 | 0.420 | 99 | 0.205 | 37 | 0.440 | 95 |
| | 250 | 0.211 | 33 | 0.465 | 109 | 0.145 | 26 | 0.485 | 104 |
| | 500 | 0.160 | 25 | 0.455 | 107 | 0.100 | 18 | 0.485 | 104 |
| | 1000 | 0.103 | 16 | 0.470 | 111 | 0.050 | 9 | 0.495 | 106 |
| | 2000 | 0.077 | 12 | 0.470 | 111 | 0.037 | 7 | 0.515 | 111 |

*1 Optical density of initial suspension was determined for suspension diluted to 26 times initial volume.
*2 2-Thiazolealanine
*3 4-Azaleucine As is apparent from Table 1, Brevibacterium flavum AJ-3226 and Corynebacterium acetoacidophilum AJ-3228, strains resistant to 2-thiazolealanine and 4-azaleucine can grow on media containing amounts of 2-thiazolealanine or 4-azaleucine, by which the growth of the respective parent strains Brevibacterium flavum ATCC 14067 and Corynebacterium acetoacidophilum ATCC 13870 is completely inhibited.

The culture medium used to produce L-leucine in the present invention may be entirely conventional. It includes an assimilable carbon source, an assimilable nitrogen source, and the usual minor nutrients. Examples of the carbon source are carbohydrates such as glucose, fructose, maltose, starch hydrolyzate, cellulose hydrolyzate or molasses, organic acids such as acetic acid, propionic acid or succinic acid, alcohols such as glycerol, and hydrocarbons such as n-paraffin. Useful nitrogen sources include ammonium sulfate, urea, ammonium nitrate, ammonium chloride or gaseous ammonia. Inorganic salts, such as phosphates, magnesium, calcium, ferrous, manganese and other minor metallic salts are generally present. When nutrient requiring mutants are used, the nutrients required should be present. Amino acids, vitamins, "Aji-Eki" (Brand Name of soybean protein hydrolyzate), yeast extracts, peptone and casamino acid are preferably present for good bacterial growth.

The fermentation of the present invention is performed at a pH between 5 and 9, at a temperature of 24° to 37°C under aerobic conditions for 2 to 7 days. The pH of the culture medium can be adjusted by adding sterile calcium carbonate, aqueous or gaseous ammonia, mineral acid or organic acid during the fermentation.

The L-leucine is recovered from the cultured broth by conventional methods.

L-Leucine produced by the present invention was identified by its Rf values in paper chromatography, its ninhydrin reaction and by bioassay with Leuconostoc mesenteroides ATCC 8042.

EXAMPLE 1

A culture medium containing 10 g/dl glucose, 0.1 g/dl $KH_2PO_4$, 0.04 g/dl $MgSO_4.7H_2O$, 4 g/dl $(NH_4)_2SO_4$, 100 γ/l biotin, 200 γ/l vitamin $B_1$ HCl, 2 ppm Fe and Mn ions, 1 ml/dl Aji-Eki (Brand Name of soybean protein hydrolyzate) and 5 g/dl $CaCO_3$, of pH 7.0 was prepared, 300 ml batches of the medium were each placed in a small glass jar-fermentor, and sterilized. The medium was inoculated with Brevibacterium flavum AJ–3226 (FERM P–420) which had previously been cultured on a bouillon slant at 30°C for 24 hours, and cultured at 31°C for 48 hours with stirring and aerating. The culture broth was found to contain 1.11 g/dl of L-leucine. One liter of the broth was centrifuged to remove bacterial cells, the supernatant was passed through a column packed with a cation exchange resin (Duolite C X 20), and after washing with water, L-leucine was eluted with 1N—$NH_4OH$ solution. The eluate was concentrated to remove ammonia, treated with active charcoal, and pure crystalline L-leucine was obtained in an amount of 5.2 g.

EXAMPLE 2

Corynebacterium acetoacidophilum AJ–3228 (FERM P–421) was inoculated on a culture medium containing 10 g/dl sucrose, 0.1 g/dl $KH_2PO_4$, 0.04 g/dl $MgSO_4.7H_2O$, 4 g/dl $(NH_4)_2SO_4$, 200 γ/l biotin, 200 γ/l vitamin $B_1.HCl$, 2 ppm Fe and Mn ions and 5 g/dl $CaCO_3$, of pH 7.5 and cultured at 30°C for 72 hours with shaking. The culture broth was found to contain 0.66 g/dl of L-leucine.

EXAMPLE 3

300 Ml of a culture medium which contained 0.4 g/dl ammonium acetate, 0.4 g/dl sodium acetate, 0.1 g/dl $KH_2PO_4$, 0.04 g/dl $MgSO_4.7H_2O$, 100 γ/l biotin, 200 γ/l vitamin $B_1.HCl$, 2 ppm Fe and Mn ions, 0.2 g/dl urea and 1 ml/dl Aji-Eki, of pH 7.0 was inoculated with Brevibacterium flavum AJ–3226 (FERM P–420) which had previously been cultured on a medium containing 3 g/dl glucose, 0.1 g/dl $KH_2PO_4$, 0.04 g/dl $MgSO_4.7H_2O$, 200 γ/l biotin, 300 γ/l vitamin $B_1.HCl$, 2 ppm of Fe and Mn ions, 0.3 g/dl urea and 3 ml/dl Aji-Eki, of pH 7.0. The pH of the medium rose to 7.7 in 3 hours from the inoculation, and the pH of the culture medium was held at 7.7 by adding 70% acetic acid solution and gaseous ammonia. After 48 hours incubation, 16.8 g/dl of acetic acid had been consumed and the culture broth was found to contain 1.34 g/dl L-leucine. One liter of the broth was treated in the same manner as in Example 1, and pure crystalline L-leucine was obtained in an amount of 6.9 g.

EXAMPLE 4

Corynebacterium glutamicum AJ–3426 (FERM P–1768) was cultured in the same manner as in Example 3, 0.11 parts of acetic acid per volume of the initial medium was consumed, and the culture broth was found to contain 0.4 g/dl L-leucine. 2.1 Grams pure crystalline L-leucine were obtained from one liter culture broth.

EXAMPLE 5

Brevibacterium lactofermentum AJ–3427 (FERM P–1769) was cultured in the same manner as in Example 3, 0.13 parts of acetic acid per volume of the initial medium was consumed, and the culture broth was found to contain 0.9 g/dl L-leucine.

EXAMPLE 6

Corynebacterium acetoacidophilum AJ–3426 (FERM P–1768) was cultured in the same manner as in Example 1, and the culture broth was found to contain 0.5 g/dl L-leucine.

EXAMPLE 7

Brevibacterium lactofermentum AJ–3427 (FERM P–1769) was cultured in the same manner as in Example 1, and the culture broth was found to contain 1.3 g/dl L-leucine.

We claim:
1. A method of producing L-leucine by fermentation which comprises:
   a. culturing a microorganism of the genera Brevibacterium or Corynebacterium on a nutrient medium under aerobic conditions,
      1. said microorganism being capable of producing extracellular L-leucine in said medium,
      2. said medium containing sources of assimilable carbon and nitrogen and minor organic and inorganic nutrients necessary to the growth of said microorganism,
      3. said microorganism being cultured on said nutrient medium until L-leucine accumulates in said medium,
      4. said microorganism being resistant to a leucine antagonist, and
   b. recovering accumulated L-leucine from said medium.

2. A method as set forth in claim 1, said microorganism being a strain of Brevibacterium flavum, Brevibacterium lactofermentum, Corynebacterium acetoacidophilum or Corynebacterium glutamicum.

3. A method as set forth in claim 1, wherein said leucine antagonist is 2-thiazolealanine, 4-azaleucine, 5′,5′,5′-trifluoroleucine, D-leucine, α-aminoisoamyl sulfonic acid, norvaline, norleucine, methallyglycine, α-amino-β-chlorobutyric acid, δ-chloroleucine, β-hydroxynorleucine, β-hydroxyleucine, cyclopentanealanine, 3-cyclopentene-1-alanine or 2-amino-4-methylhexanoic acid.

4. A method as set forth in claim 1, said microorganism being resistant to 2-thiazolealanine.

5. A method as set forth in claim 4, wherein said microorganism is Brevibacterium flavum FERM P-420, Brevibacterium lactofermentum FERM P-1769, Corynebacterium acetoacidophilum FERM P-421 or Corynebacterium glutamicum FERM P-1768.

6. A method as set forth in claim 5, wherein said microorganisms is a strain of Brevibacterium.

7. A method as set forth in claim 1, wherein said microorganism is a mutant of a parent strain and capable of growth on a culture medium containing enough of said leucine antagonist to suppress the growth of said parent strain.

* * * * *